US00RE51069E

(19) United States
(12) Reissued Patent
Seo et al.

(10) Patent Number: US RE51,069 E
(45) Date of Reissued Patent: Oct. 13, 2026

(54) WINDOW TYPE AIR CONDITIONER

(71) Applicant: LG ELECTRONICS INC., Seoul (KR)

(72) Inventors: Sungho Seo, Seoul (KR); Wonsuk Jang, Seoul (KR); Hokyun Choi, Seoul (KR)

(73) Assignee: LG ELECTRONICS INC., Seoul (KR)

(21) Appl. No.: 18/414,241

(22) Filed: Jan. 16, 2024

Related U.S. Patent Documents

Reissue of:
(64) Patent No.: 10,527,311
Issued: Jan. 7, 2020
Appl. No.: 15/814,080
Filed: Nov. 15, 2017

(30) Foreign Application Priority Data

Jul. 3, 2017 (KR) ..... 10-2017-0084303

(51) Int. Cl.

| | |
|---|---|
| ***F24F 11/83*** | (2018.01) |
| ***F24F 1/027*** | (2019.01) |
| ***F24F 1/24*** | (2011.01) |
| ***F24F 11/85*** | (2018.01) |
| ***F24F 11/89*** | (2018.01) |
| ***F24F 13/08*** | (2006.01) |
| ***F24F 13/20*** | (2006.01) |
| ***F24F 13/30*** | (2006.01) |

(52) U.S. Cl.
CPC ..... *F24F 11/83* (2018.01); *F24F 1/027* (2013.01); *F24F 1/24* (2013.01); *F24F 11/85* (2018.01); *F24F 11/89* (2018.01); *F24F 13/08* (2013.01); *F24F 13/20* (2013.01); *F24F 13/30* (2013.01); *F24F 2013/202* (2013.01); *F24F 2013/205* (2013.01)

(58) Field of Classification Search
CPC .... F24F 3/30; F24F 11/83; F24F 1/027; F24F 11/85; F24F 13/20; F24F 11/89; F24F 13/08; F24F 1/24; F24F 13/205; F24F 13/202
See application file for complete search history.

(56) References Cited

U.S. PATENT DOCUMENTS

| | | | | |
|---|---|---|---|---|
| 6,321,553 | B1 * | 11/2001 | Bushnell | F24F 1/027 62/262 |
| 6,330,807 | B1 * | 12/2001 | Correa | F24F 13/20 62/262 |
| 2006/0021370 | A1 * | 2/2006 | Cho | F24F 1/027 62/262 |
| 2017/0176056 | A1 * | 6/2017 | Eicher | F25B 13/00 |

FOREIGN PATENT DOCUMENTS

| | | | | |
|---|---|---|---|---|
| CN | 104566672 | A * | 4/2015 | F24F 13/10 |
| KR | 10-2005-0104737 | A | 11/2005 | |
| KR | 101045421 | B1 * | 6/2011 | F24F 13/20 |
| KR | 20170073322 | A * | 6/2017 | F24F 1/58 |

* cited by examiner

*Primary Examiner* — William C Doerrler
(74) *Attorney, Agent, or Firm* — Bryan Cave Leighton Paisner LLP

(57) ABSTRACT

A window type air conditioner including a case installed on a wall or a window of an installation space to provide an inner space, an air guide installed in the case to partition the inner space into an outdoor-side air passage and an indoor-side air passage, a compressor installed in the outdoor-side air passage to perform an inverter control, and control components disposed in the outdoor-side air passage to perform the inverter control.

23 Claims, 13 Drawing Sheets

WINDOW TYPE AIR CONDITIONER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[The present] *This* application *is reissue of U.S. Pat. No. 10,527,311 B2, issued Jan. 7, 2020 from U.S. application Ser. No. 15/814,080 filed on Nov. 15, 2017, which* claims priority under 35 U.S.C. § 119 and 35 U.S.C. § 365 to Korean Patent Application No. 10-2017-0084303 (filed on Jul. 3, 2017), [which is] *the contents of which are all* hereby incorporated by reference *herein* in [its] *their* entirety.

BACKGROUND

The present disclosure relates to a window type air conditioner.

Air conditioners are devices that cool or heat an indoor space by using a refrigeration cycle. The refrigeration cycle includes a compressor, a condenser, an expansion device, and an evaporator. These components are successively connected to each other through tubes. A refrigerant circulates through these components via the tubes.

Air conditioners are generally classified into split type air conditioners and window type air conditioners.

A split type air conditioner includes an indoor unit installed in an indoor space to discharge conditioned air into the indoor space and an outdoor unit connected to the indoor unit through tubes and installed in an outdoor space. A heat exchanger may be provided in each of the outdoor unit and the indoor unit. The indoor unit includes an indoor heat exchanger, and the outdoor unit includes a compressor and an outdoor heat exchanger. When the air conditioner performs a cooling operation, the outdoor heat exchanger serves as a condenser, and the indoor heat exchanger serves as an evaporator. When the air conditioner performs a heating operation, the indoor heat exchanger serves as a condenser, and the outdoor heat exchanger serves as an evaporator.

A window type air conditioner includes a condenser and an evaporator that are installed together inside a case. The condenser is disposed at an outdoor side of the case to heat-exchange with external air, and the evaporator is disposed at an indoor side of the case to heat-exchange with indoor air. The indoor air may be discharged into the indoor space after being cooled in the evaporator.

Korean Patent Publication Number 10-2005-0104737 (filed Apr. 29, 2004) discloses a conventional air conditioner having several limitations. One such limitation, for example, is that a control box in which control components for controlling an operation of the air conditioner is installed at the indoor side, and thus, heat generated in the control box is introduced into the indoor space to deteriorate cooling efficiency in the indoor space. Another limitation, for example, is that the compressor provided in the air conditioner is provided as a constant speed compressor, resulting in high noise and high power consumption.

The present application provides an improved design for an a window type air conditioner and is directed to solving the above described problems.

SUMMARY

The present invention has been made in order to solve at least the above problems associated with the conventional technology.

Embodiments of the present disclosure provide a window type air conditioner which includes a compressor and control components, which are capable of controlling an inverter, to reduce noise generated in the air conditioner and power consumption.

Embodiments of the present disclosure also provide a window type air conditioner in which control components are adequately disposed on an air passage within a case of the air conditioner to easily dissipate heat of the control component and improve spatial utilization.

Embodiments of the present disclosure provide a window type air conditioner in which a control box and a reactor assembly are disposed in an indoor-side air passage so as to be easily cooled, and heat generated in the control box and the reactor assembly does not act on an indoor side.

Embodiments of the present disclosure also provide a window type air conditioner in which a reactor assembly is stably supported by a base and thus is not affected by condensed water existing in the base.

Embodiments of the present disclosure also provide a window type air conditioner having a compact passage configuration so that an outdoor-side air flow and an indoor-side air flow are smoothly generated.

According to one embodiment of the present disclosure, a window type air conditioner includes: a case installed on a wall or a window of an installation space to provide an inner space; an air guide installed in the case to partition the inner space into an outdoor-side air passage and an indoor-side air passage; a compressor installed in the outdoor-side air passage to perform an inverter control; and control components disposed in the outdoor-side air passage to perform the inverter control.

The control components may include: a first control component disposed in an upper portion of the outdoor-side air passage; and a second control component disposed in a lower portion of the outdoor-side air passage. One of the first and second control components may include a control box, and the other one of the first and second control components may include a reactor assembly.

A shroud coupled to the condensation fan to guide a flow of outdoor air may be further provided in the outdoor-side air passage, and the control box may be disposed in a space between the air guide and the shroud.

The window type air conditioner may further include a fixing bracket for fixing the control box to the air guide and the shroud.

The first and second control components may be disposed on an inner surface of one case side part of the two case side parts, and the compressor may be disposed on an inner surface of the other case side part of the two case side parts.

The condensation fan may include an axial fan, and when the condensation fan is driven, the outdoor air suctioned through the outdoor suction part may pass through the first and second control components and be suctioned toward a suction side in an axial direction of the condensation fan.

The evaporation fan may include a centrifugal fan, and when the evaporation fan is driven, indoor air suctioned through the first and second suction parts may pass through the evaporator and be suctioned toward a suction side in an axial direction of the evaporation fan.

The control box may include: a PCB assembly including a heat generation component and a heat dissipation plate; a PCB support part supporting a lower portion of the PCB assembly and including a support partition part for partitioning the heat generation component from the heat dissipation plate; and a box case coupled to the PCB support part to accommodate the heat generation component therein.

According to another embodiment of the present disclosure, a window type air conditioner includes: a case including an outdoor-side air passage and an indoor-side air passage; an air guide installed in the case to partition an outdoor-side air passage from an indoor-side air passage; a condensation fan installed in the outdoor-side air passage; a shroud coupled to the condensation fan to guide a flow of outdoor air; an evaporation fan installed in the indoor-side air passage; and a control box disposed in a space between the air guide and the shroud.

The details of one or more embodiments are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
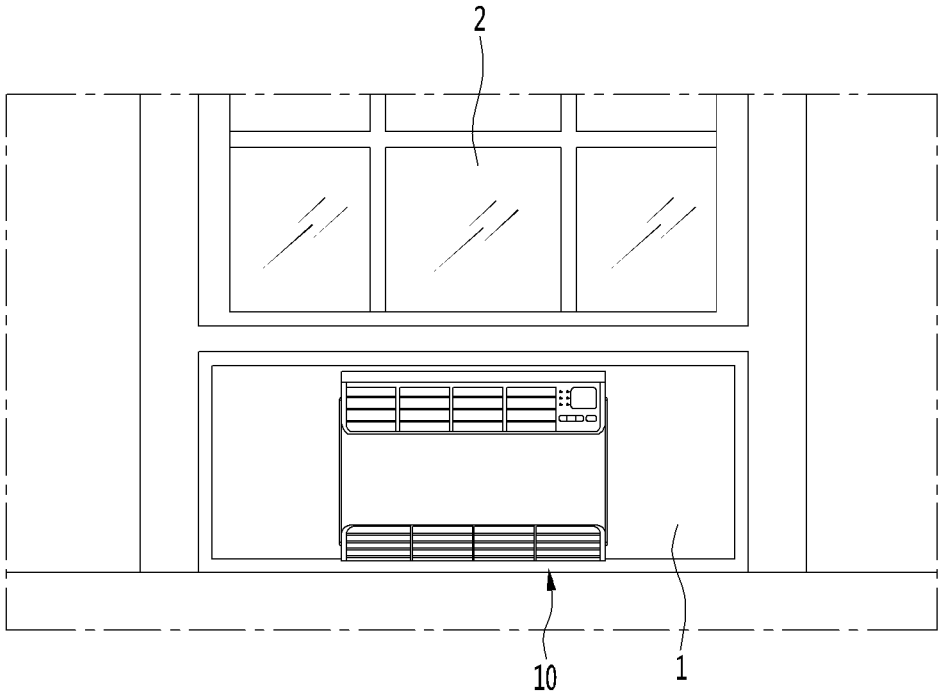
FIG. 1 is a view illustrating an air conditioner is installed on a wall according to an embodiment of the invention.
Figure 2:
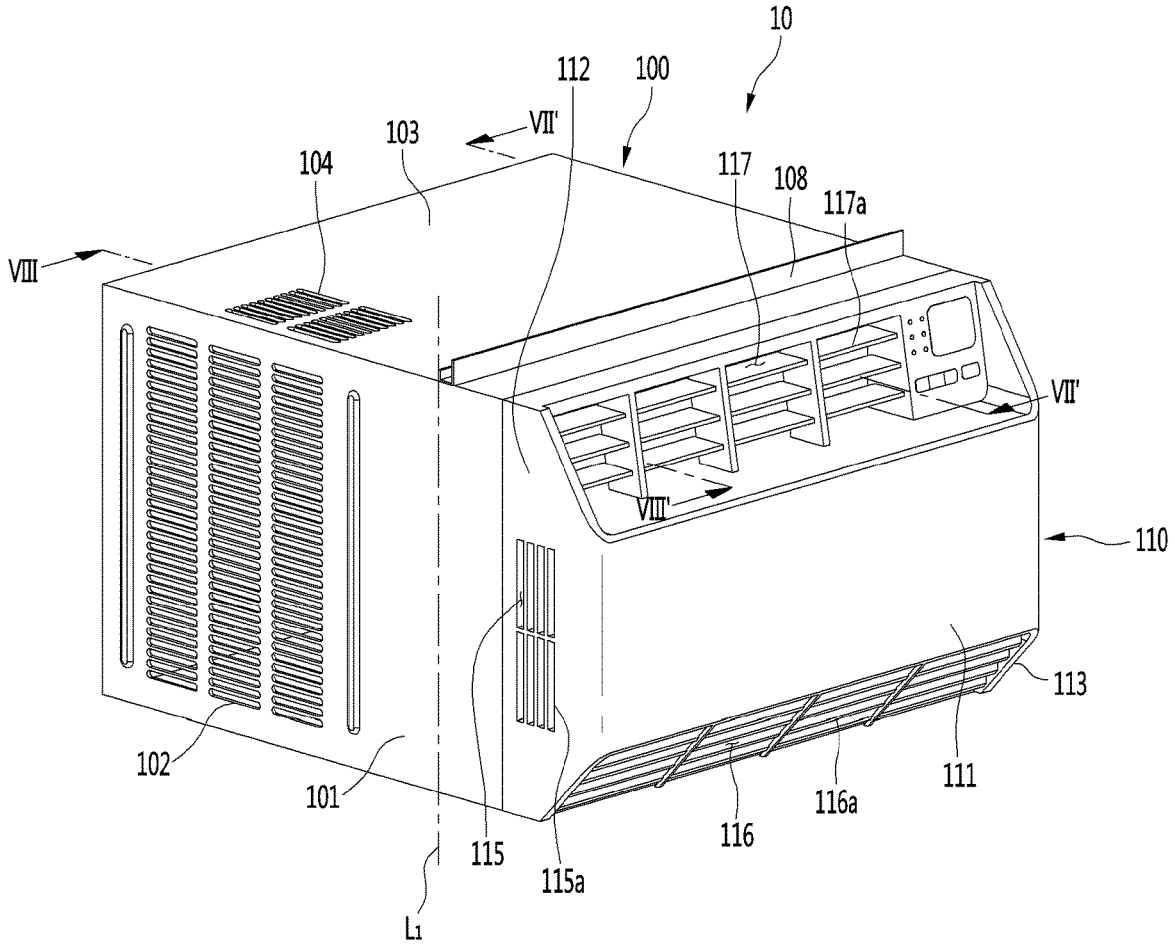
FIG. 2 is a perspective view illustrating an outer appearance of the air conditioner according to an embodiment of the invention.

FIG. 1 is a view illustrating an air conditioner that is installed on a wall according to an embodiment of the invention. FIG. 2 is a perspective view illustrating an outer appearance of the air conditioner according to an embodiment of the invention.

[Air Conditioner Installed on Wall or Window]

Referring to FIG. 1, a window type air conditioner 10 (hereinafter, referred to as an air conditioner) may be installed on a wall 1 or at a window 2 of a building or dwelling. For example, FIG. 1 illustrates a state in which a hole is formed in the wall 1 to install the air conditioner 10 in the building having the wall 1 and the window 2. Alternatively, as illustrated in the drawings, an installation space may be provided in a region in which the window 2 is disposed to install the air conditioner 10 in the installation space.

[Case]

Referring to FIG. 2, the air conditioner 10 may have a hexahedral shape, or an approximately hexahedral shape (not limited thereto). In detail, the air conditioner 10 may include a case 100 having a hexahedral space with a front portion that is opened and forms an inner space. The case 100 may include a case side part 101 having an outdoor suction part 102 through which outdoor air is suctioned and a case top part 103 disposed on an upper portion of the case side part 101 and having a heat dissipation part through which heat generated in the case 100 is released. The heat dissipation part may comprise heat dissipation holes 104, such as shown in FIG. 2.

The case side part 101 may be disposed on each of both sides (opposite sides, e.g., right and left sides) of the case 100, and the outdoor suction part 102 may be disposed on each of both the case side parts 101.

The outdoor suction part 102 may include a plurality of first through-holes that penetrate through at least a portion of the case side part 101. The heat dissipation holes 104 may include a plurality of second through-holes that penetrate through a portion of the case top part 103.

An installation bracket 108 that is configured to be installed on the wall 1 at the window 2 may be provided at the case top part 103. The air conditioner 10 may be supported or secured on the wall 1 or at the window 2 through the installation bracket 108.

A front portion of the case side part 101 may be disposed in an indoor space, and a rear portion may be disposed at the wall 1 or in an outdoor space. By way of example, a boundary line that separates the front portion and the rear portion is displayed as reference symbol "L1" in FIG. 2. A rear panel having an outdoor discharge part 109 (see FIG. 13) through which outdoor-side air is discharged may be provided in the rear portion of the case 100. The rear portion 100 is opposite the portion and adjacent the case side parts 101.

The case 100 may include a case bottom part 105 defining a bottom surface of the case 100. A main body 120 may be accommodated in the case bottom part 105. A base 121 of the main body 120 may be seated on the case bottom part 105.

[Front Panel]

The air conditioner 10 may further include a front panel 110 disposed at a front portion of the case 100. The front panel 110 may have a plurality of indoor suction parts 115 and 116 and a discharge part 117.

The front panel 110 may include a panel front part 111 forming a front surface of the air conditioner 10, a panel side part 112 extending backward from each of both side ends (opposite side ends, e.g., right and left side ends) of the panel front part 111, and a panel bottom part 113 extending backward from a lower end of the panel front part 111.

The plurality of indoor suction parts 115 and 116 include a first suction part 115 provided at the panel side part 112. The first suction part 115 may be provided at each of the panel side parts 112. A first suction grill 115a may be provided at the panel side part 112. The first suction grill 115a may define the first suction part 115.

The plurality of indoor suction parts 115 and 116 include a second suction part 116 provided at the panel bottom part 113. A second suction grill 116a may be provided at the panel bottom part 113. The second suction grill 116a may define the second suction part 116.

The discharge part 117 may be provided at an upper portion of the front panel 110. A discharge grill 117a may be provided at the upper portion of the panel front part 111. The discharge grill 118a may define the discharge part 117.

Air suctioned from both left and right sides of the front panel 110 through the first suction parts 115 and air suctioned from the lower portion of the front panel 110 through the second suction part 116 may pass through the main body 120 (shown in FIG. 3) provided in the case 100 and then be discharged through the discharge part 117.

A display part for displaying operation information of the air conditioner 10 and a display device 118 including an input part for inputting an operation command may be disposed at the upper portion of the front panel 110. For example, as shown in FIG. 3, the display device 118 may be located at a side of the discharge part 117.

Figure 3:
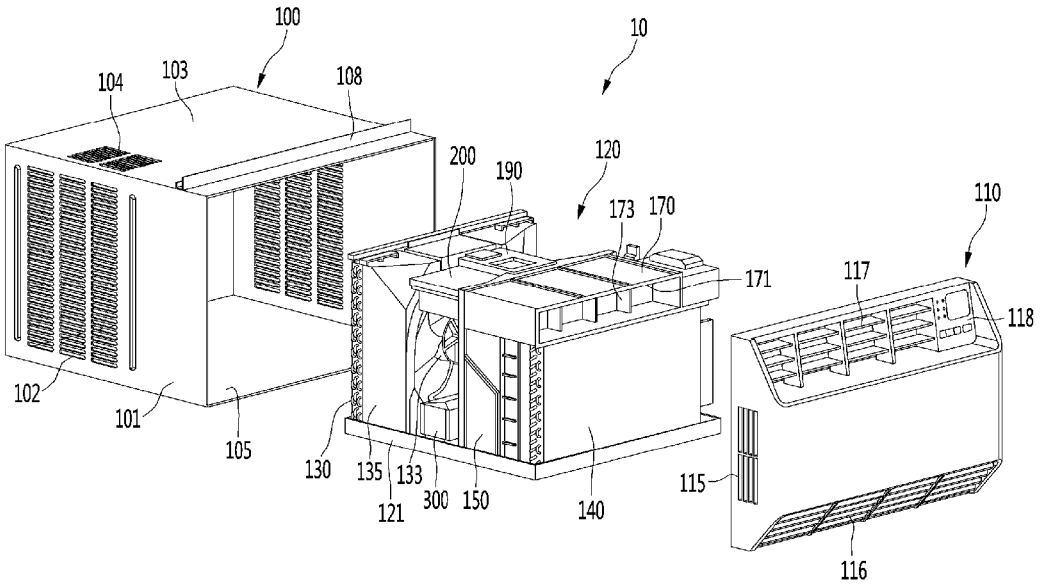
FIG. 3 is an exploded perspective view illustrating constituents of the air conditioner according to an embodiment of the invention.
Figure 4:
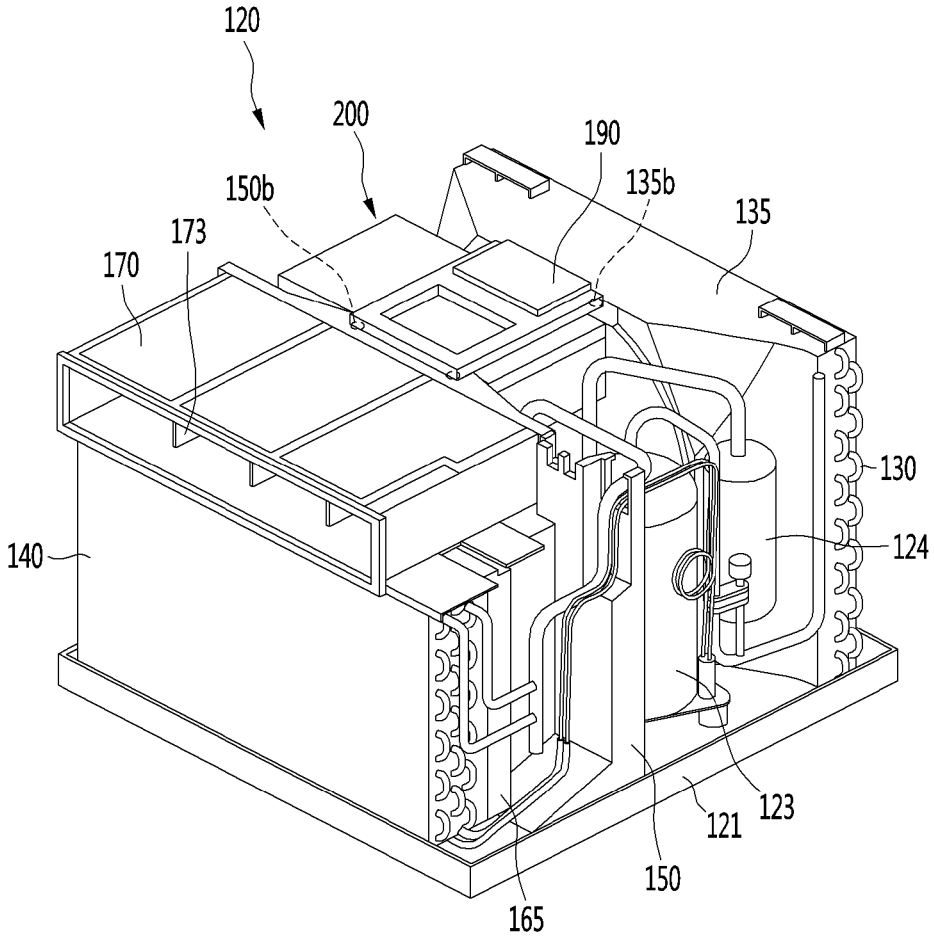
FIG. 4 is a perspective view illustrating constituents of a main body of the air conditioner according to an embodiment of the invention.
Figure 5:
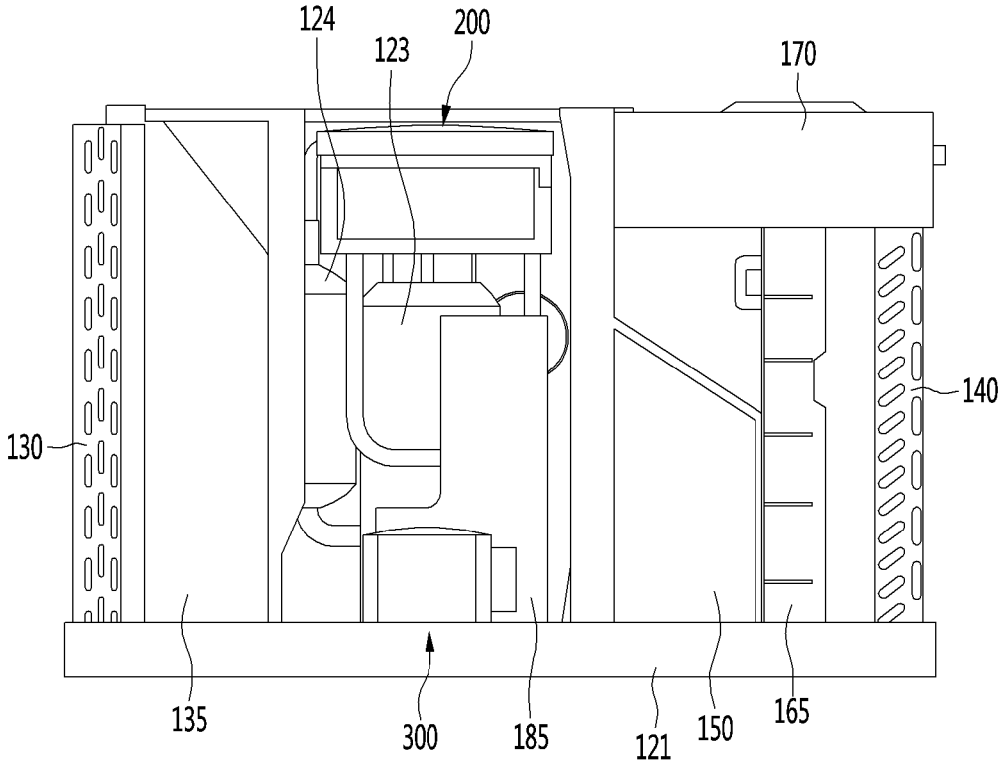
FIG. 5 is a side view illustrating the constituents of the main body.
Figure 6:
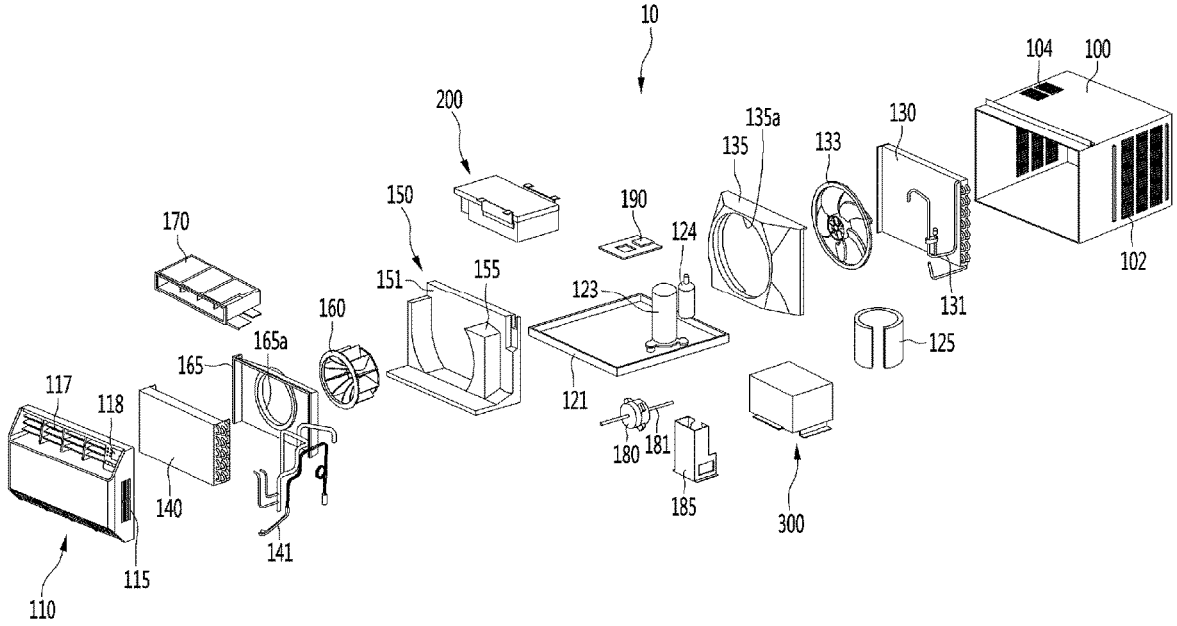
FIG. 6 is an exploded perspective view illustrating the constituents of the main body.

FIG. 3 is an exploded perspective view illustrating constituents of the air conditioner according to an embodiment of the invention. FIG. 4 is a perspective view illustrating constituents of the main body of the air conditioner according to an embodiment of the invention. FIG. 5 is a side view illustrating the constituents of the main body. FIG. 6 is an exploded perspective view illustrating the constituents of the main body.

[Main Body]

Referring to FIG. 3, the air conditioner 10 may include a main body 120 provided inside the case 100. The main body 120 may be separably coupled to the case 100. The main body 120 may be separated or removed from the case 100 for maintenance or repair procedures.

The main body may include a base 121, an outdoor-side body which is installed on the base 121 and through which the outdoor air flows, and an indoor-side body which is installed on the base 121 and through which the indoor air flows. The outdoor-side body and the indoor-side body may be disposed on both sides with respect to an air guide 150, respectively. For example, the outdoor air may flow through one side, and the indoor air may flow through the other side with respect to the air guide 150.

[Constituent of Outdoor-Side Body]

The outdoor-side body may include a compressor 123, a gas/liquid separator 124, a condenser 130, a condensation fan 133, a shroud 135, and a fan motor 180.

The outdoor-side body further includes a control box 200 and a reactor assembly 300 as components (control components) for controlling the inverter of the air conditioner 10, for example, for controlling an inverter of the compressor 123 or blower fans 133 and 160. The control box 200 may be referred to as a "first control component", and the reactor assembly 300 may be referred to as a "second control component".

[Compressor and Gas/Liquid Separator]

The compressor 123 may include an inverter compressor that is adjustable in frequency. Thus, when a cooling load of the air conditioner 10 is low, the compressor 123 operation may decrease in frequency. Conversely, when the cooling load is high, the compressor 123 operation may increase in frequency. The compressor 123 may include a rotary compressor.

The compressor 123 may be installed on a top surface of the base 121. A soundproof member 125 for reducing noise generated in the compressor 123 may be disposed on an outer circumferential surface of the compressor 123. For example, the soundproof member 125 may be formed of a rubber, sponge, or fiber material.

The gas/liquid separator 124 may be disposed at a side of the compressor 123. The gas/liquid separator functions to separate a gas refrigerant of a refrigerant suctioned into the compressor 123 and then guide the gas refrigerant to the compressor 123.

The compressor 123 may be disposed adjacent to an inner surface of one case side part 101 of the two case side parts 101. The control box 200 and the reactor assembly 300 may be disposed adjacent to an inner surface of the other case side part 101 of the two case side parts 101.

[Condenser and Condensation Fan]

The condenser 130 may be disposed inside the rear portion of the case 100. A first tube assembly 131 may be connected to one side of the condenser 130. The refrigerant compressed in the compressor 123 may be introduced into the condenser 130 through the first tube assembly 131.

The condenser 130 may be disposed so as to allow air passing through the condensation fan 133 to flow therethrough with respect to an outdoor-side air flow. For example, the condenser 130 may be disposed at an outlet side of the condensation fan 133.

The condensation fan 133 may include an axial fan. Thus, outdoor air suctioned into the case 100 through the outdoor suction part 102 provided in each of both sides of the case 100 may be suctioned in an axial direction of the condensation fan 133 and then be discharged in the axial direction of the condensation fan 133. The outdoor air may be discharged into the outdoor space through the outdoor discharge part 109 provided in the rear portion of the case 100.

[Shroud]

The shroud 135 may be coupled to the condensation fan 133 to guide a flow of the air passing through the condensation fan 133. The shroud 135 may include a shroud opening 135a for guiding the air to a suction side of the condensation fan 133. For example, the outdoor air suctioned into the case 100 through the outdoor suction part 102 may be suctioned into the condensation fan 133 through the shroud opening 135a. The shroud opening 135a may have a circular shape (not limited thereto) and be configured so that the condensation fan 133 is inserted therein.

[Component for Controlling Inverter: Control Box]

The control box 200 may be disposed between the shroud 135 and the air guide 150. For example, the outdoor-side air passage 195 through which the outdoor air flows may be provided in a space located between the shroud 135 and the air guide 150.

The control box 200 may be disposed in an upper portion of the outdoor-side air passage 195. With the above-described arrangement, the control box 200 that generates high-temperature heat may be cooled by the outdoor air suctioned through the outdoor suction part 102 passing through the control box 200. Detailed constituents of the control box 200 will be described below.

[Fixing Bracket]

The outdoor-side body may further include a fixing bracket 190 coupled to the control box 200. The fixing bracket 190 may extend from the shroud 135 to the air guide so that the control box 200 is disposed in the space located between the shroud 135 and the air guide 150.

The control box 200 may be coupled to an upper portion of the shroud 135 and an upper portion of the air guide 150 by the fixing bracket 190. A shroud coupling part 135b may be disposed on the shroud 135, and an air guide coupling part 150b may be disposed on the air guide 150.

Both side portions of the fixing bracket 190 may be respectively coupled to box brackets 250 (see, e.g., FIG. 9) disposed on both sides of the control box 200 and coupled to the shroud coupling part 135b and the air guide coupling part 150b by using a coupling member. For example, the fixing bracket 190 may be coupled to the control box 200, the shroud 135, and the air guide 150 at once through the coupling member. Through the above-described constituents, the control box 200 may be stably supported on the shroud 135 and the air guide 150.

[Component for Controlling Inverter: Reactor Assembly]

The reactor assembly 300, in general, is an electronic device that stores electromagnetic energy and has reactance that is highly inductive to a sudden change in current. The reactor assembly 300 may be installed on the base 121 and disposed below the control box 200. The reactor assembly 300 requires cooling because it generates high-temperature heat.

In detail, the reactor assembly 300 and the control box 200 may be disposed in the outdoor-side air passage 195. For example, the control box 200 and the reactor assembly 300 may be arranged to be vertically spaced apart from each other in the outdoor-side air passage 195. Through the above-described constituents, heat from upper air of the outdoor air flowing through the outdoor-side air passage 195 may be released while passing through the control box, and heat from lower air may be released while passing through the reactor assembly 300.

Since the control box 200 and the reactor assembly 300 are disposed in the outdoor-side air passage 195, and the outdoor-side air passage 195 is separated from the indoor-side air passage 191 (see, e.g., FIG. 7) by the air guide 150, heat generated in the control box 200 or the reactor assembly 300 may be prevented from being transferred to the indoor space.

[Fan Motor]

The fan motor 180, in general, is a motor that imparts a rotational force to the blower fans 133 and 160. For example, the fan motor 180 may be coupled to both the condensation fan 133 and an evaporation fan 160 to rotate the condensation fan 133 and the evaporation fan 160 together with each other.

In detail, for example, a motor shaft 181 may be coupled to the fan motor 180, and the motor shaft 181 may pass through the fan motor 180 so as to extend to both sides of the fan motor 180. Also, both the sides of the motor shaft 181 may be coupled to the condensation fan 133 and the evaporation fan 160. For example, the condensation fan 133 and the evaporation fan 160 may be connected to the motor shaft 181 of the fan motor 180. When the fan motor 180 is driven, the condensation fan 133 and the evaporation fan 160 may rotate together with each other. The fan motor 180 may include a BLDC motor of which an inverter is controllable (not limited thereto).

The fan motor 180 may be disposed at a central portion with respect to a vertical direction in a space between the air guide 150 and the shroud 135, or approximately the central portion thereof. For example, the fan motor 180 may be disposed in the space between the control box 200 and the reactor assembly 300 with respect to the vertical direction. Thus, according to the above-described constituents, the spatial utilization of the outdoor-side body may be improved such that the components constituting the outdoor-side body are prevented from interrupting the air flow in the outdoor-side air passage 195.

[Motor Mount]

The outdoor-side body further may include a motor mount 185 supporting the fan motor 180. The motor mount 185 may be supported on the base 121 and protrude upward from the base 121. The motor mount 185 may reduce transmission of noise or vibration generated in the fan motor 180 to the base 121.

The fan motor 180 may be spaced above the base 121 by the motor mount 185 so as to prevent (or significantly reduce) condensed water existing in the base 121 from permeating into the fan motor 180.

[Constituent of Indoor-Side Body]

The indoor-side body may include an evaporator 140, an orifice 165, the evaporation fan 160, a discharge guide 170, the fan motor 180, and the motor mount 185.

[Evaporator and Evaporation Fan]

The evaporator 140 may be disposed on an inner surface of the front panel 110. Indoor air suctioned through the plurality of indoor suction parts 115 and 116 may pass through the evaporator 140. The evaporator 140 may be connected to a second tube assembly 141 that guides a flow of the refrigerant introduced into the evaporator 140. The second tube assembly 141 may include an expansion device for decompressing the refrigerant that is condensed in the condenser 130. For example, the expansion device may include at least one of an expansion valve and a capillary tube.

The evaporation fan 160 may be disposed so that air passing through the evaporator 140 passes therethrough with respect to the indoor-side air flow. For example, the evaporation fan 160 may be disposed at an outlet side of the evaporator 140.

The evaporation fan 160 may include a centrifugal fan. Thus, the indoor air suctioned into the case through the plurality of indoor suction parts 115 and 116 provided in both the sides and the lower portion of the front panel 110 may flow backward (rearward) via a front surface of the evaporator 140 and then be suctioned in an axial direction of the evaporation fan 160. Also, the indoor air may be discharged in a radial direction of the evaporation fan 160.

[Orifice]

The orifice 165 may be coupled to the evaporation fan 160 to guide a flow of the air passing through the evaporation fan 160. The orifice 165 may include an orifice opening 165a for guiding the air to a suction side of the evaporation fan 160. For example, the indoor air cooled in the evaporator 140 may be suctioned into the evaporation fan 160 through the orifice opening 165a. The orifice opening 165a may have a circular shape (not limited thereto) and be disposed at a position corresponding to a front end of the evaporation fan 160.

[Discharge Guide]

The discharge guide 170, in general, is a component that guides the air passing through the evaporation fan 160 toward the front panel 110, i.e., a front side. For example, the discharge guide 170 may have a hollow panel or pipe shape (not limited thereto). Also, a discharge passage through which the air passing through the evaporation fan 160 passes may be provided in the discharge guide 170.

An outlet part 171 through which the air is discharged to the discharge part 117 of the front panel 110 is provided in a front portion of the discharge guide 170. The discharge part 117 and the outlet part 171 may be aligned with each other in a front and rear direction.

Also, an outlet guide 173 for guiding the flow direction of the air is provided in the discharge guide 170. The outlet guide 173 may have a plate shape (not limited thereto) and may be disposed to extend forward and backward on an inner surface of the discharge guide 170. According to the above-described constituents, the air flowing through the discharge guide 170 may stably flow forward toward the discharge part 117.

The discharge guide 170 may be coupled to a front surface of the air guide to extend forward. Thus, the air passing through the evaporation fan 160 may be guided to the discharge guide 170 through a closed space formed by the discharge guide 170 and the air guide 150.

The discharge guide 170 may be supported above the evaporator 140 and the orifice 165. Also, the rear portion of the discharge guide 170 may be supported on a top surface of a guide support part 166 provided on the air guide 150. The guide support part 155, in general, is a portion protruding forward from the guide body 151 of the air guide 150.

[Air Guide]

The air guide 150 serves as a partition plate that partitions or separates the outdoor-side body from the indoor-side body and separates the indoor-side air passage 191 from the outdoor-side air passage 195.

A front surface of the air guide 150 guides the indoor air passing through the evaporation fan 160 so that the indoor air is introduced into the discharge guide 170. A rear surface of the air guide 150 guides the outdoor air suctioned through the outdoor suction part 102 so that the outdoor air is suctioned into the condensation fan 133.

The air guide 150 may include a guide body 151 that separates the indoor-side air passage 191 from the outdoor-side air passage 195. The guide body 151 may be supported on the base 121 and extend upwardly relative to the base 121. The guide body 151 may have an upper end thereof that is coupled to or in contact with the case top part 103.

A shaft penetration part 151a (see, e.g., FIG. 13) through which the motor shaft 181 passes may be provided in the guide body 151. The shaft penetration part 151a may be disposed at a central portion of the guide body 151, or approximately the central portion thereof.

The air guide 150 may further include a guide support part 155 that protrudes forward (outward) from the guide body 151. The discharge guide 170 may be supported on a top surface of the guide support part 155.

Figure 7:
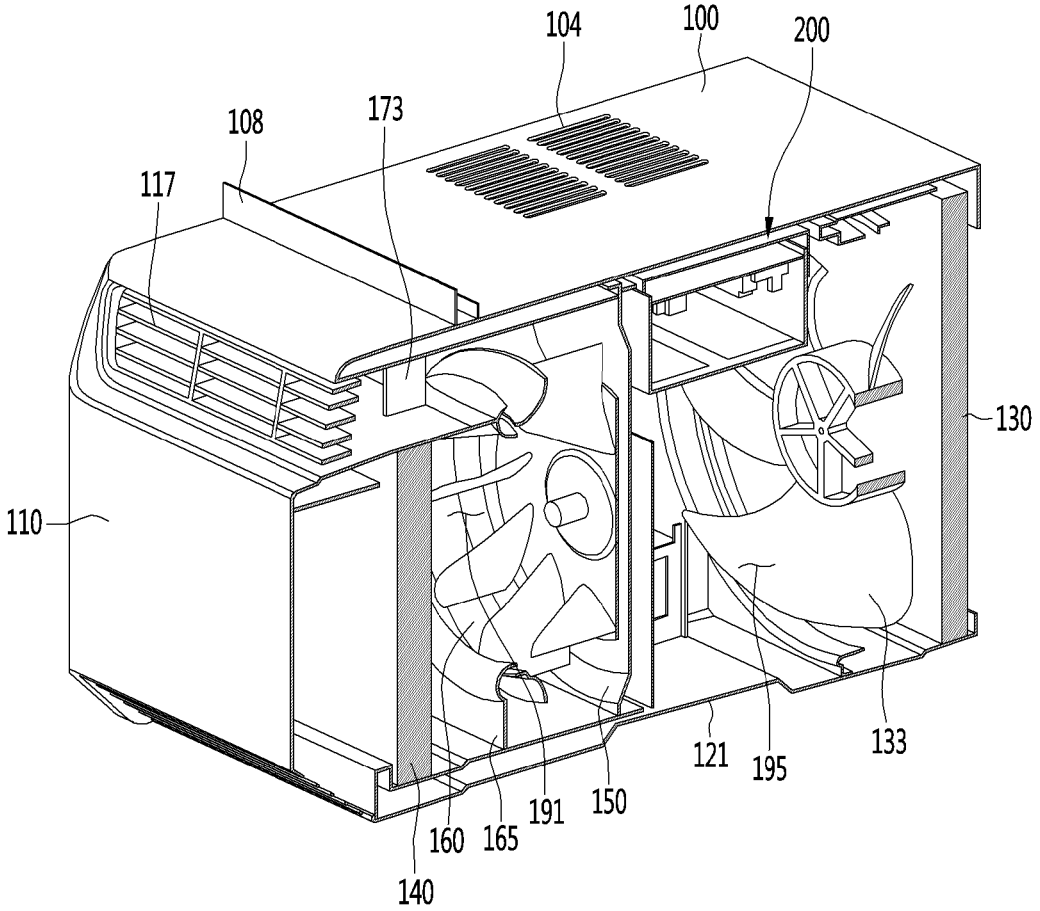
FIG. 7 is a cross-sectional view taken along line VII-VII' of FIG. 2.
Figure 8:
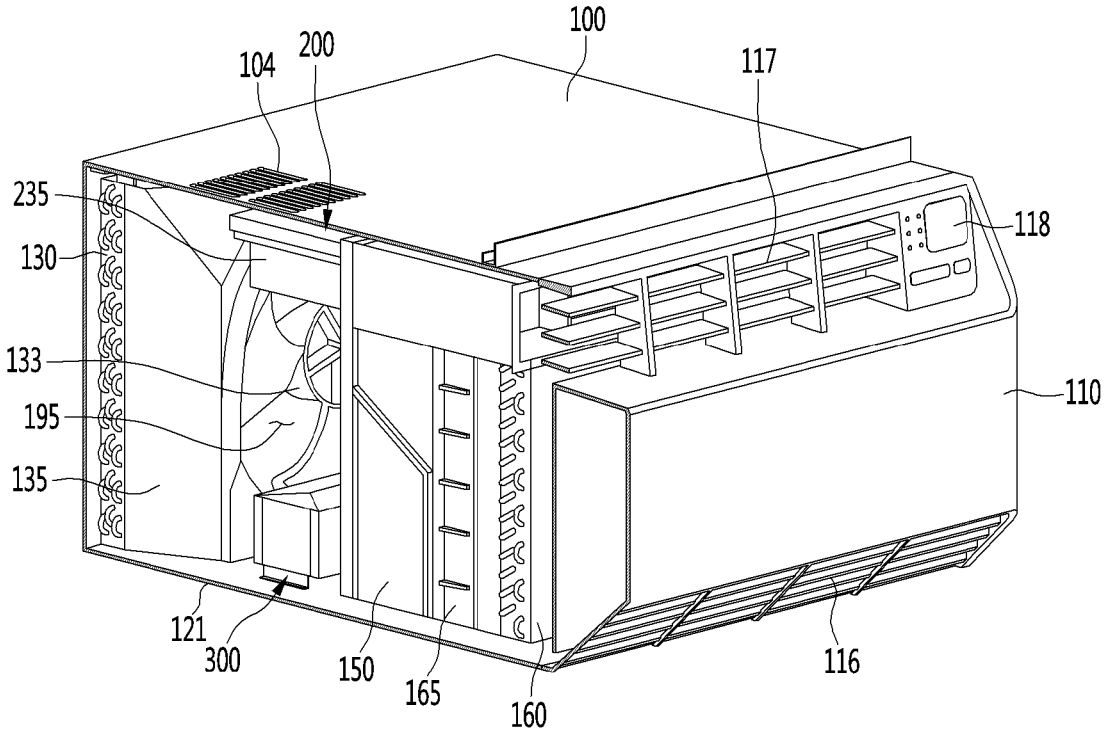
FIG. 8 is a cross-sectional view taken along line VIII-VIII' of FIG. 2.

FIG. 7 is a cross-sectional view taken along line VII-VII' of FIG. 2, and FIG. 8 is a cross-sectional view taken along line VIII-VIII' of FIG. 2.

Referring to FIGS. 7 and 8, the case 100 accommodates therein both the indoor-side air passage 191 through which the indoor air flows and the outdoor-side air passage 195 through which the outdoor air flows. The indoor-side air passage 191 and the outdoor-side air passage 195 may be arranged to be partitioned into front and rear sides by the air guide 150.

Here, the "front side" may represent a side at which the front panel 110 is disposed from the air guide 150. The "rear side" may represent a side opposite to the front side. In other words, the rear side may be a side from which the outdoor air is discharged (a side at which the outdoor discharge part is disposed) from the air guide 150.

[Indoor-Side Air Passage]

The indoor-side air passage 191 may accommodate the evaporator 140 for cooling air, the evaporation fan 160 for generating a cooled air flow, and the discharge guide 170 for guiding the air passing through the evaporation fan 160 to the discharge part 117 of the front panel 110.

For example, the indoor-side air passage may include a first indoor-side passage through which the air suctioned through the plurality of indoor suction parts 115 and 116 flows to an inflow side of the evaporator 140 (a front side of the evaporator 140), a second indoor-side passage through the air is suctioned from the discharge side of the evaporator 140 in an axial direction of the evaporation fan 160, and a third indoor-side passage through which the air discharged in the radial direction of the evaporation fan 160 is introduced into the discharge guide 170 to flow to the discharge part 117 of the front panel 110.

[Outdoor-Side Air Passage]

The outdoor-side air passage 195 may accommodate therein the condensation fan 133 for generating the suction of the outdoor air through the outdoor suction part 102, the fan motor 180 for providing a driving force to the condensation fan 133 and the evaporation fan 160, the condenser 130 for condensing the outdoor air passing through the fan motor 180, and the control box 200 and the reactor assembly 300, which are control components for controlling an operation of the air conditioner 10. The compressor 123 and the gas/liquid separator 124 may be also be disposed in the outdoor-side air passage 195.

The outdoor-side air passage 195 may include a first outdoor-side passage through which the outdoor air suctioned through the outdoor suction part 102 of both the outdoor suction parts 102 cools the control box 200 and the reactor assembly 300 while passing through the control box 200 and the reactor assembly 300 and then is suctioned in the axial direction of the condensation fan 133, and a second outdoor-side passage through the outdoor air is discharged in the axial direction of the condensation fan 133 to pass through the condenser 130.

The control box 200 and the reactor assembly 300 may be disposed on the inner surface of the case side part 101 to allow the outdoor air having a relatively low temperature and passing through the outdoor suction part 102 to flow therethrough, thereby improving a cooling effect of the control box 200 and the reactor assembly 300. For example, the control box 200 and the reactor assembly 300 may be disposed at the upstream side of the condenser 130 with respect to the flow of the outdoor air.

Also, the control box 200 may be disposed in the upper portion of the outdoor-side air passage 195, and the reactor assembly 300 may be disposed in a lower portion of the outdoor-side air passage 195. As described above, the control box 200 and the reactor assembly 300 may be spaced apart from each other, and thus, the cooling passages for cooling the control box 200 and the reactor assembly 300 may not be affected from each other. Thus, the cooling effect of the control components may be improved, and resistance in the outdoor-side air flow may be relatively low as compared with conventional apparatus.

Another embodiment will now be described. Although the control box 200 is disposed in the upper portion of the outdoor-side air passage 195, and the reactor assembly 300 is disposed in the lower portion of the outdoor-side air passage 195 in this embodiment, it is understood that the present disclosure is not limited thereto. For example, the control box 200 may be disposed in the lower portion of the outdoor-side air passage 195, and the reactor assembly 300 may be disposed in the upper portion of the outdoor-side air passage 195.

A heat dissipation plate 235 provided in the control box 200 may be disposed closer to the case side part 101 than elements 233 that are heat generation components of the control box 200 so as to more easily and efficiently perform cooling of the heat dissipation plate 235.

The outdoor air suctioned through the other outdoor suction part 102 of both the outdoor suction parts 102 may pass through the compressor 123 that is disposed adjacent to the other outdoor suction part 102 and installed in the outdoor-side air passage 195.

Figure 9:
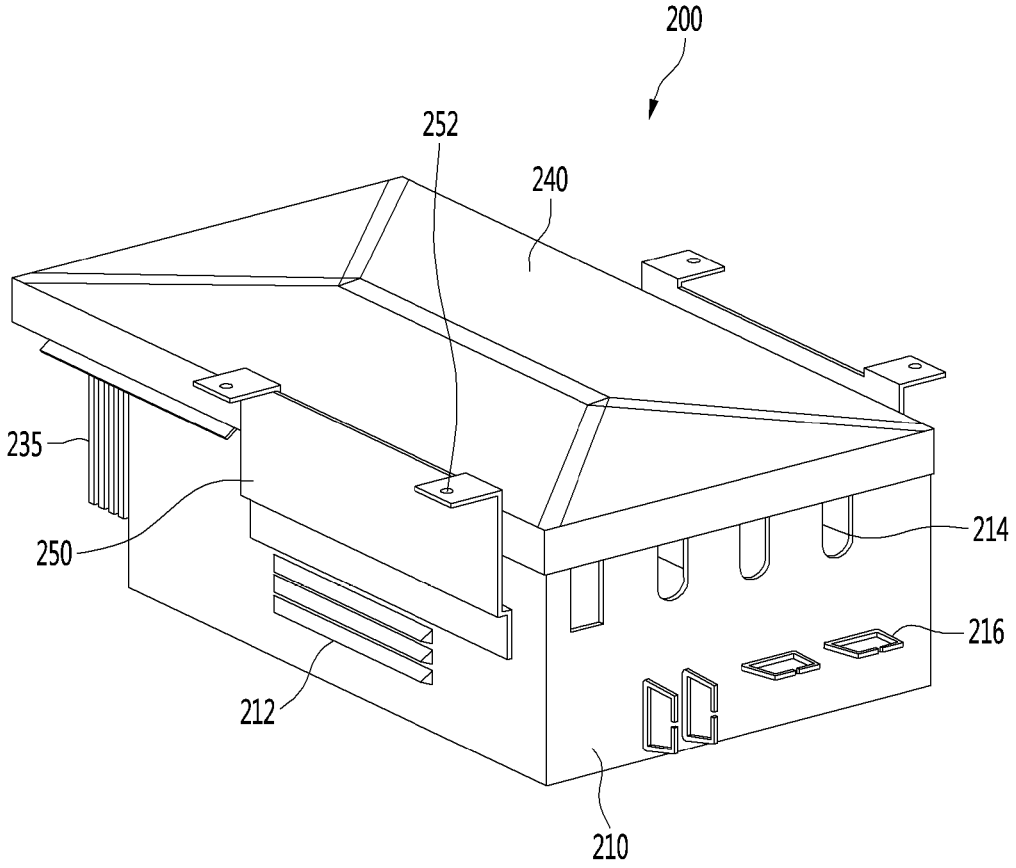
FIG. 9 is a perspective view illustrating constituents of a control box according to an embodiment of the invention.
Figure 10:
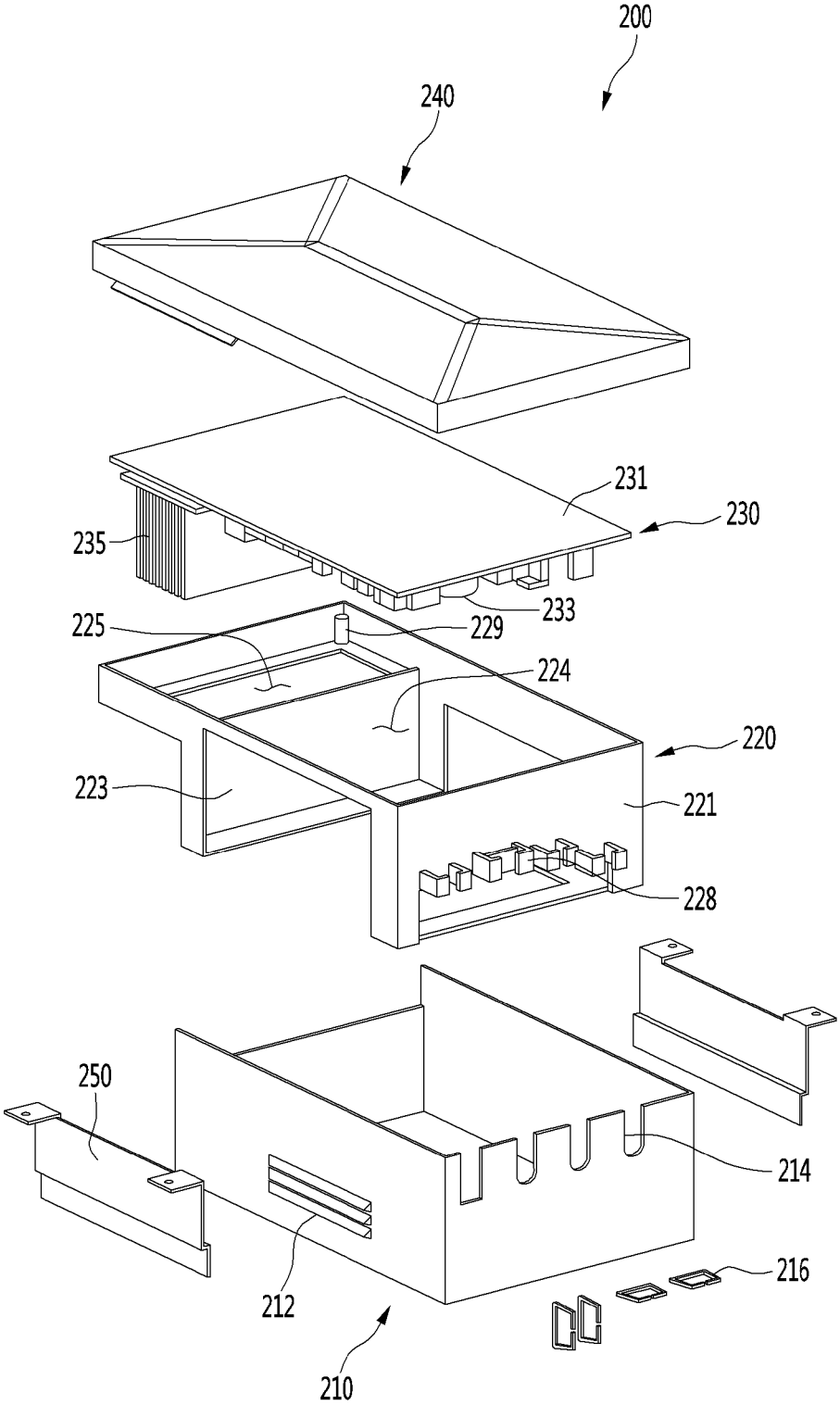
FIG. 10 is an exploded perspective view illustrating the constituents of the control box.

FIG. 9 is a perspective view illustrating constituents of the control box according to an embodiment, and FIG. 10 is an exploded perspective view illustrating the constituents of the control box.

<Control Box>

Referring to FIGS. 9 and 10, the control box 200 may include a box case 210, a PCB support part 220 coupled to the box case 210, a PCB assembly 230 supported by the PCB support part 220, and a box cover 240 covering an upper portion of the PCB assembly 230.

[PCB Assembly]

The PCB assembly 230 may include a substantially rectangular PCB 231 (not limited thereto) and an element 233 provided on the PCB 231. The element 233 may be disposed on a bottom surface of the PCB 231. The element 233 may include heat generation components for controlling the inverter of the air conditioner 10. For example, the heat generation components may include a micron computer, an inverter, a converter, an EEPROM, a rectifier diode, or a condenser.

The PCB assembly 230 may further include a heat dissipation plate 235 for releasing heat generated in the PCB assembly 230 or the element 233. For example, the heat dissipation plate 235 may be disposed on the bottom surface of the PCB 231. The element 233 and the heat dissipation plate 235 may protrude downward from the PCB 231.

The heat dissipation plate 235 may include a plurality of fins that are spaced apart from each other, e.g., spaced apart in a left and right direction. Each of the plurality of fins may have a rectangular thin plate shape (not limited thereto).

The outdoor air suctioned through the outdoor suction part 102 may pass first through the heat dissipation plate 235 of the PCB assembly 230 to cool the heat dissipation plate 235.

[PCB Support Part]

The control box 200 may further include the PCB support part 220 disposed below the PCB 231 to support the PCB 231. The PCB support part 220 may include a PCB coupling part 229 to which the PCB 231 is coupled, e.g., screw-coupled. The PCB coupling part 229 may be disposed on the PCB support part 220.

The PCB support part 220 may include a side part 221 extending in a vertical direction and a support partition part 223. The side part 221 may include at least one wire guide 228 connected to the PCB assembly 230 to guide a position of a wire. The wire guide 228 may include a rib protruding from the side part 221. The rib may collect or hold the wire to prevent the wire from moving.

The support partition part 223 may be disposed between the element 233 and the heat dissipation plate 235 to serve as a blacking plate so that the outdoor air suctioned through the outdoor suction part 102 does not directly act on the element 233. Such configuration may prevent malfunction of the PCB assembly 230, which may occur when the outdoor air having a high flow rate directly acts on the element 233.

A first accommodation part 224 in which the element 233 is disposed may be provided in a space located between the side part 221 and the support partition part 223. A second accommodation part 225 in which the heat dissipation plate 235 is disposed may be provided between the support partition part 223 and the case side part 101. Through the above-described constituents, the spatial utilization may be improved for the installation of the element 233 and the heat dissipation plate 235.

[Box Case]

The control box 200 may further include the box case 210 which provides the installation space of the element 233. The box case 210 may have a hexahedral shape (not limited thereto) with a top surface opened.

A case heat dissipation hole 212 through which the heat generated in the PCB assembly 230 is released to the outside may be formed in the box case 210. For example, the case heat dissipation hole 212 may include a through-hole in which at least a portion of a first surface of the box case is penetrated or cut.

The box case 210 may include a wire penetration part 214 through which the wire connected to the PCB assembly 230 is led out to the outside of the box case 210. For example, the wire penetration part 214 may be provided by recessing an upper portion of the box case 210 in a downward direction. The box cover 240 may be coupled to an upper portion of the wire penetration part 214. The wire may pass through a space formed by the wire penetration part 214 and the box cover 240.

A clamp 216 may be provided on the box case 210. The clamp 216 may be configured to fix the wire that is led out to the outside of the box case 210 through the wire penetration part 214. Such configuration may prevent the wire from making contact with the surface of the control box having a relatively high temperature.

[Box Bracket]

The box bracket 250 may be coupled to the control box 200. The box bracket 250 may be disposed on each of both sides of the control box 200 so that the fixing bracket is coupled thereto. A coupling hole 252 coupled to the fixing bracket 190 may be formed in the box bracket 250. For example, a screw may be inserted into the coupling hole 252 and then coupled to the fixing bracket 190.

Also, the screw may be coupled to the shroud coupling part 135b or the air guide coupling part 150b to fix the fixing bracket 190, the shroud 135, and the air guide 150.

[Reactor Assembly]

Figure 11:
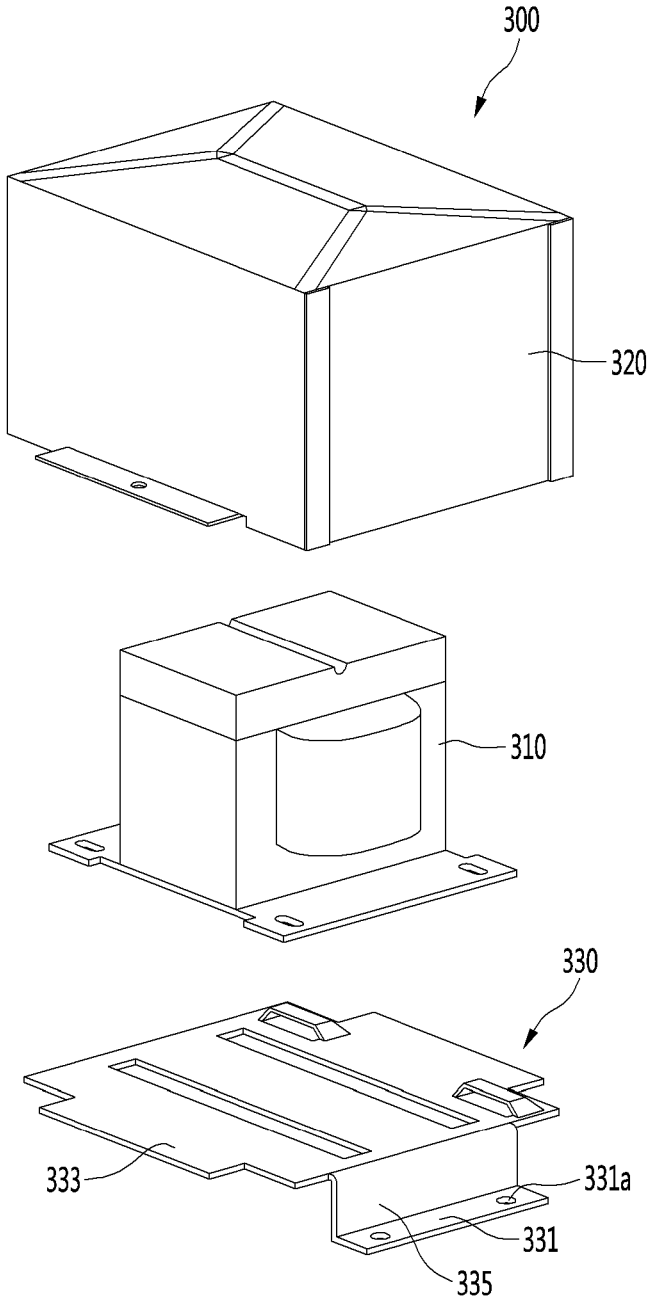
FIG. 11 is an exploded perspective view illustrating constituents of a reactor assembly according to an embodiment of the invention.

FIG. 11 is an exploded perspective view illustrating constituents of the reactor assembly according to an embodiment. Referring to FIG. 11, an air conditioner 10 may include the reactor assembly 300. The reactor assembly 300 may be installed on the base 121 and disposed in the lower portion of the outdoor-side air passage 195, i.e., below the control box 200.

The reactor assembly 300 may include a reactor bracket 330 supported on the base 121, a reactor 310 supported on the reactor bracket 330, and a reactor cover 320 coupled to the reactor bracket 330 to accommodate the reactor 310 therein (referred to herein as a "protection member").

The reactor bracket 330 may include a base coupling part having a base coupling hole 331a coupled to the base 121, an extension part 335 extending upward from the base coupling part 331, and a reactor seating part 333 which extends from the extension part 335 in a horizontal direction and on which the reactor 310 is seated. A coupling member may be coupled to the base coupling hole 331a.

Due to the structure of the reactor bracket 330, the reactor 310 may be disposed at a position that is spaced above the base 121. Thus, malfunction of the reactor 310 may be prevented in the event that condensed water stored in the base 121 acts on the reactor 310.

Figure 12:
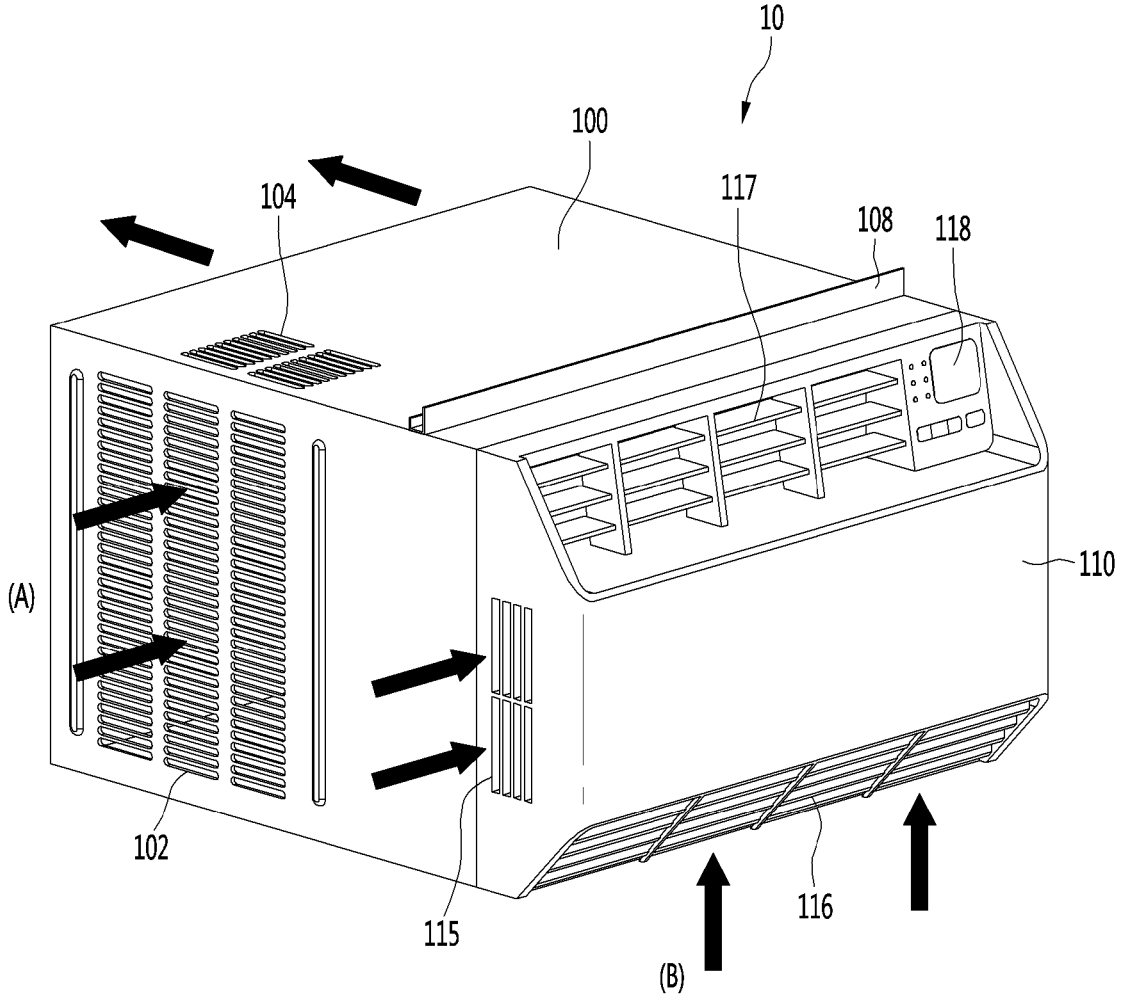
FIG. 12 is a perspective view illustrating an outdoor-side air flow A and an indoor-side air flow B according to an embodiment of the invention.
Figure 13:
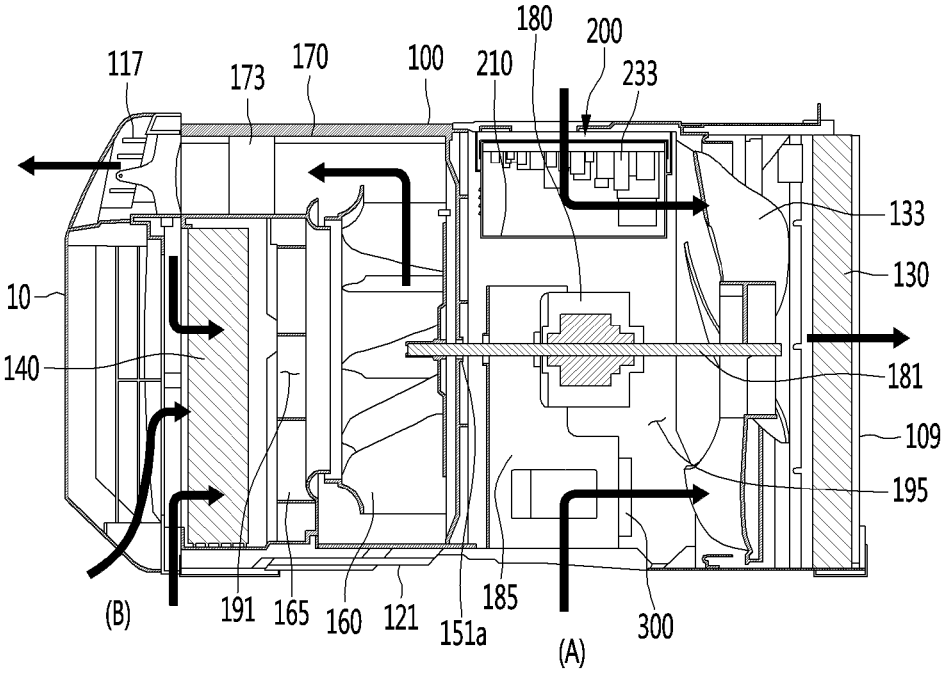
FIG. 13 is another perspective view illustrating an outdoor-side air flow A and an indoor-side air flow B according to an embodiment of the invention.

FIGS. 12 and 13 are perspective views illustrating an outdoor-side air flow A and an indoor-side air flow B according to an embodiment. Referring to FIGS. 12 and 13, when the air conditioner 10 operates, the outdoor-side air flow A and the indoor-side air flow B occur. The outdoor-side air flow A and the indoor-side air flow B are described more fully below.

[Outdoor-Side Air Flow A]

The outdoor-side air flow A may occur by the operation of the condensation fan 133. For example, when the condensation fan 133 is driven, the outdoor air may be suctioned toward an inner center of the case 100 through the outdoor suction part 102 provided in each of the two case side parts 101.

The outdoor air suctioned into the case 100 through one outdoor suction part 102 may cool the control box 200 and the reactor assembly 300 while passing through the control box 200 and the reactor assembly 300, which are disposed adjacent to the case side part 101.

Here, since the control box 200 and the reactor assembly 300 are disposed in the upper and lower portions of the outdoor-side air passage 195, respectively, a portion of the suctioned outdoor air may cool the control box 200, and the other portion of the suctioned outdoor air may cool the reactor assembly 300. Thus, the outdoor air may cool the control box 200 and the reactor assembly 300 to improve the cooling efficiency.

A first outdoor-side passage, through which the outdoor air passing through each of the control box 200 and the reactor assembly 300 changes in direction to flow to the suction side in the axial direction of the condensation fan 133, is provided.

A second outdoor-side passage, through which the outdoor air passing through the condensation fan 133 flows to the discharge side in the axial direction of the condensation fan 133 and then is discharged to the rear side of the case 100 through the outdoor discharge part 109, is provided.

[Indoor-Side Air Flow B]

The indoor-side air flow B may occur by the operation of the evaporation fan 160. For example, when the evaporation fan 160 is driven, the indoor air may be suctioned into the inner center of the case 100 through the plurality of indoor suction parts 115 and 116.

A first indoor-side passage, through which the suctioned indoor air flows to the inflow side of the evaporator 140, and a second indoor-side passage, through which the indoor air is suctioned from the outlet side of the evaporator 140 in the axial direction of the evaporation fan 160, may be provided.

Also, a third indoor-side passage, through which the indoor air passing through the evaporation fan 160 is discharged in the radial direction of the evaporation fan 160 and then is introduced into the discharge guide 170 disposed above the evaporation fan 160, may be provided. The indoor air flowing through the inside of the discharge guide 170 may flow toward (e.g., in a forward direction) the front panel 110 and then be discharged into the indoor space through the discharge part 117 of the front panel 110.

According to an embodiment of the invention, since the inverter control of the air conditioner is performed, the output of the compressor or the blower fan, which depends on the indoor load, may be more easily controlled than in a conventional apparatus.

According to another embodiment of the invention, the control components for stably performing the control of the inverter may be provided, and the space for installing the control components may be improved in utilization as compared with a conventional apparatus.

According to another embodiment of the invention, the first and second control components may be more easily cooled by the suctioned indoor air as compared with a conventional apparatus.

According to another embodiment of the invention, the control box may be stably installed in the outdoor-side air passage.

According to another embodiment of the invention, the compressor and the control components, which are the main heating sources of the air conditioner, may be more easily cooled as compared with a conventional apparatus.

According to another embodiment of the invention, air may more smoothly flow through the outdoor-side air passage as compared with a conventional apparatus.

According to another embodiment of the invention, air may more smoothly flow through the indoor-side air passage as compared with a conventional apparatus.

According to another embodiment of the invention, the control box may be more easily cooled, and the effects of the elements of the PCB assembly by the suctioned outdoor air may be reduced as compared with a conventional apparatus.

According to another embodiment of the invention, since the control box is disposed in the space between the air guide and the shroud, the control box may be more easily cooled as compared with a conventional apparatus.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A window type air conditioner comprising:

a case having an inner space, *wherein the case comprises a first case side part and a second case side part*;

an air guide disposed in the case to separate the inner space into an outdoor-side air passage and an indoor-side air passage;

the outdoor-side air passage having disposed therein a compressor, a condenser, a condensation fan, and a controller to perform an inverter control; and the indoor-side air passage having disposed therein an evaporator and an evaporation fan, wherein the controller comprises:

a control box mounted in the outdoor-side air passage, and a reactor mounted in the outdoor-side air passage, the reactor disposed below the control box,

*wherein the control box and the reactor are disposed at an inner surface of one of the first case side part and the second case side part, and*

*the compressor is disposed at an inner surface of the other of the first case side part and the second case side part.*

2. The window type air conditioner of claim 1, further comprising:

a shroud disposed in the outdoor-side air passage, the shroud being coupled to the condensation fan so as to guide a flow of outdoor air, wherein the control box is disposed in a space between the air guide and the shroud.

3. The window type air conditioner of claim 2, further comprising:

a fixing bracket that secures the control box to the air guide and the shroud.

4. The window type air conditioner of claim 3, further comprising:

a coupling part provided on an upper portion of the air guide or the shroud; and a coupling member that secures the coupling part to the fixing bracket.

5. The window type air conditioner of claim 1, wherein [the case comprises:]

[a] *the* first case side part and [a] *the* second case side part [that] respectively comprise an outdoor suction part for suctioning outdoor air; and a case top part disposed on upper portions of the two case side parts.

[6. The window type air conditioner of claim 5, wherein the control box and the reactor are disposed at an inner surface of one of the first case side part and the second case side part, and the compressor is disposed on an inner surface of the other of the first case side part and the second case side part.]

7. The window type air conditioner of claim [6] *1*, wherein the condensation fan comprises an axial fan, and when the condensation fan is driven, the outdoor air suctioned through the outdoor suction part passes through the control box and the reactor and is suctioned toward a suction side of the condensation fan in an axial direction.

8. The window type air conditioner of claim 7, wherein the condenser is disposed at an outlet side of the condensation fan.

[9. The window type air conditioner of claim 1, further comprising a front panel disposed at a front portion of the case, wherein the front panel comprises:

a panel front part having a discharge part;

a panel side part extending in a rearward direction from each of both side ends of the panel front part and having a first suction part; and a panel bottom part extending in a rearward direction from a lower end of the panel front part and having a second suction part.]

[10. The window type air conditioner of claim 9, wherein the evaporation fan comprises a centrifugal fan, and when the evaporation fan is driven, indoor air suctioned through the first suction part and the second suction part passes through the evaporator and is suctioned toward a suction side of the evaporation fan in an axial direction.]

[11. The window type air conditioner of claim 10, further comprising a discharge guide disposed above the evaporation fan to guide the indoor air discharged in a radial direction of the evaporation fan to the discharge part.]

[12. The window type air conditioner of claim 1, further comprising:

a fan motor disposed in the outdoor-side air passage; and a motor shaft extending from the fan motor and coupled to the condensation fan and the evaporation fan.]

13. The window type air conditioner of claim 1, wherein the control box *further* comprises:

a PCB assembly comprising a heat generation component and a heat dissipation plate;

a PCB support part that supports a lower portion of the PCB assembly, the PCB support part comprising a support partition part that separates the heat generation component from the heat dissipation plate; and a box case coupled to the PCB support part to accommodate the heat generation component therein, wherein the heat generation component includes at least one of a micron computer, an inverter, a converter, an EEPROM, a rectifier diode and a condenser.

[14. A window type air conditioner comprising:

a case comprising a top surface and a bottom surface, the case having an inner space comprising an outdoor-side air passage and an indoor-side air passage;

an air guide provided in the case that separates the outdoor-side air passage from the indoor-side air passage, the air guide having an upper portion and a lower portion, the upper portion of the air guide being located adjacent the top surface of the case and above the lower portion of the air guide;

a condensation fan provided in the outdoor-side air passage, the outdoor-side air passage having an upper portion and a lower portion, the upper portion of the outdoor-side air passage being located adjacent the top surface of the case and above the lower portion of the outdoor-side air passage;

a shroud coupled to the condensation fan to guide a flow of outdoor air, the shroud having an upper portion and a lower portion, the upper portion of the shroud being located adjacent the top surface of the case and above the lower portion of the shroud;

an evaporation fan provided in the indoor-side air passage;

a control box disposed between the air guide and the shroud; and a reactor assembly disposed in the outdoor-side air passage, the reactor disposed below the control box.]

[15. The window type air conditioner of claim 14, further comprising a fixing bracket disposed on the upper portion of the air guide or the shroud to attach the control box to the upper portion of the outdoor-side air passage.]

[16. The window type air conditioner of claim 15, further comprising:

a main body disposed inside the case, the main body comprising a base that is disposed on the bottom surface of the case, wherein the reactor assembly is mounted on the base and disposed in the lower portion of the outdoor-side air passage.]

[17. The window type air conditioner of claim 16, further comprising a fan motor having a motor shaft coupled to the condensation fan and the evaporation fan, wherein the fan motor is disposed between the control box and the reactor assembly with respect to a vertical direction relative to the base.]

[18. The window type air conditioner of claim 16, wherein the reactor assembly comprises:

a reactor bracket attached to the base;

a reactor mounted to the reactor bracket; and a reactor cover coupled to the reactor bracket to accommodate the reactor.]

*19. A window type air conditioner comprising:*

*a case having an inner space and including an outdoor suction part;*

*a partition serving as an air guide to separate the inner space into an outdoor-side air passage and an indoor-side air passage,*

*wherein the partition serves as an air guide for both outdoor air and indoor air;*

*wherein a compressor, a condenser, a condensation fan, and a controller to perform an inverter control are disposed in the outdoor-side air passage;*

*wherein an evaporator and an evaporation fan are disposed in the indoor-side air passage, and*

*wherein the controller comprises:*

*a control box mounted in the outdoor-side air passage,*

*wherein the control box includes a PCB assembly having a heat generation component and a heat dissipation plate, and*

*wherein the heat dissipation plate is disposed adjacent the outdoor suction part of the case, and*

*a reactor mounted in the outdoor-side air passage, the reactor being disposed below the control box,*

*wherein the case comprises:*

*a first case side part and a second case side part that respectively comprise the outdoor suction part including a first and a second of plurality of outdoor suction parts for suctioning outdoor air; and*

*a case top part disposed on upper portions of the two case side parts,*

*wherein the controller is disposed adjacent to the first of the plurality of outdoor suction parts,*

*wherein the compressor is disposed adjacent to the second of the plurality of outdoor suction parts, and*

*wherein the heat dissipation plate is disposed closer to the first plurality of outdoor suction parts disposed adjacent to the controller than to the second plurality of outdoor suction parts disposed adjacent to the compressor.*

*20. The window type air conditioner of claim 19, further comprising:*

*a shroud disposed in the outdoor-side air passage, the shroud being coupled to the condensation fan to guide a flow of outdoor air,*

*wherein the control box and the compressor are disposed in a space between the air guide and the shroud.*

*21. The window type air conditioner of claim 20, further comprising:*

*a fixing bracket that secures the control box to the air guide and the shroud.*

*22. The window type air conditioner of claim 21, further comprising:*

*a coupling part provided on an upper portion of the air guide or the shroud; and*

*a coupling member that secures the coupling part to the fixing bracket.*

*23. The window type air conditioner of claim 19, wherein the control box and the reactor are disposed at an inner surface of one of the first case side part and the second case side part, and*

*the compressor is disposed at an inner surface of the other of the first case side part and the second case side part.*

*24. The window type air conditioner of claim 23, wherein the condensation fan comprises an axial fan, and*

*when the condensation fan is driven, the outdoor air suctioned through the first and the second outdoor suction parts pass through the control box and the reactor and is suctioned toward a suction side of the condensation fan in an axial direction.*

*25. The window type air conditioner of claim 24, wherein the condenser is disposed at an outlet side of the condensation fan.*

*26. The window type air conditioner of claim 19, wherein the control box further comprises:*

*a PCB support part that supports a lower portion of the PCB assembly, the PCB support part comprising a support partition part that separates the heat generation component from the heat dissipation plate; and*

*a box case coupled to the PCB support part to accommodate the heat generation component therein,*

*wherein the heat generation component includes at least one of a micron computer, an inverter, a converter, an EEPROM, a rectifier diode and a condenser.*

*27. The window type air conditioner of claim 26, wherein the PCB support part includes:*

*a first accommodation part in which the PCB assembly is disposed, and*

*a second accommodation part in which the heat dissipation plate is disposed,*

*wherein the support partition part is disposed between the first accommodation part and the second accommodation part.*

*28. The window type air conditioner of claim 26, wherein the PCB support part further includes a wire guide connected to the PCB assembly to guide a position of a wire.*

*29. The window type air conditioner of claim 26, wherein the box case includes a heat dissipation hole through which heat generated in the PCB assembly is released.*

*30. The window type air conditioner of claim 19, wherein the controller further comprises a reactor assembly including the reactor,*

*wherein the reactor assembly further includes a reactor bracket for disposing the reactor spaced apart from the case.*

*31. The window type air conditioner of claim 30, wherein the reactor assembly further includes a reactor cover covering the reactor.*

*32. The window type air conditioner of claim 30, wherein the reactor bracket includes:*

*a coupling part coupled to the case;*

*an extension part extending from the coupling part; and*

*a seating part on which the reactor is seated.*

*33. The window type air conditioner of claim 19, wherein the case top part further comprise a plurality of heat dissipation holes,*

*the plurality of heat dissipation holes disposed above control box.*

* * * * *